July 4, 1967 J. G. D. MANWARING 3,329,796

RADIO FREQUENCY APPARATUS

Filed July 28, 1966 4 Sheets-Sheet 1

July 4, 1967 J. G. D. MANWARING 3,329,796

RADIO FREQUENCY APPARATUS

Filed July 28, 1966 4 Sheets-Sheet 2

United States Patent Office 3,329,796
Patented July 4, 1967

3,329,796

RADIO FREQUENCY APPARATUS

Joshua George Dowell Manwaring, Needham, Mass., assignor to Radio Frequency Company Inc., Medfield, Mass., a corporation of Massachusetts Filed July 28, 1966, Ser. No. 568,474
20 Claims. (Cl. 219—10.55)

ABSTRACT OF THE DISCLOSURE

Radio frequency heating apparatus having a generally tubular conductive enclosure with opposite, spaced parallel connected sheet metal wall members connected at their ends to provide an extended electrically conductive loop, a lumped constant multi-plate resonant circuit component mounted within said enclosure along a wall thereof and a radio frequency generator connected to said component. The multi-plate resonant circuit component is in the form of two series of plates arranged alternately with one another, defining a radio frequency current path in one series of plates of opposite direction from that in the other series of plates for mutual inductive coupling therebetween. The radio frequency generator, shown in the form of a vacuum tube, has its plate connected to one series of plates, the cooperating two series of plates being the major resonant circuit component of the output of the radio frequency generator and energizing the enclosure to heat material therewithin. Electrode systems are shown as positioned within the enclosure for optimum transfer of radio frequency energy to such material.

This invention relates to radio frequency circuitry and components, and is a continuation-in-part of my co-pending U.S. application, Ser. No. 441,564, filed Mar. 22, 1965 now abandoned which is in turn a continuation-in-part of my co-pending U.S. application, Ser. No. 362,417, filed Apr. 24, 1964 now abandoned, which is in turn a continuation-in-part of my co-pending U.S. application Ser. No. 275,417, filed Apr. 24, 1963, now abandoned, which was in turn a continuation-in-part of my U.S. application, Ser. No. 128,326, filed July 18, 1961, now Patent No. 3,095,548. More particularly, the present invention relates to improvements in the novel resonant circuit component having lumped capacitance and inductance and its circuitry as described in said patent. Said improvements are dominated in some respects by certain of the claims of said patent, although not specifically shown and described therein.

In heretofore known radio frequency heating equipment, it has been a problem to provide an adequately shielded, stable heating zone of extended area at high radio frequencies at upwards of 10 to 100 megacycles or more, through or past which, for example, sheet or other material could be conveyed at high speed to dry it or finishes thereon.

In this regard, the present invention provides radio frequency heating apparatus utilizing a tuned load circuit comprising a generally tubular electrically conductive enclosure, preferably of sheet metal and of generally rectangular cross-section, providing an axially extended conductive loop preferably having a pair of opposite open ends spaced a substantial distance from one another and preferably with a lumped constant plate circuit component such as is shown, described and claimed in said patent, having its series of plates mounted within said enclosure perpendicular to its walls and extending therealong the enclosure and positioned between its open ends. The plate series is connected to the enclosure and also to a radio frequency generator for heating material positioned within or without the enclosure, as between electrodes adjacent thereto or extending to or through openings therein or as conveyed therethrough, the substantial axial dimension of the enclosure in the latter case providing a suitably long heating cycle for material even when conveyed at relatively high speed through the enclosure. The effective electrical dimensions of the conductive loop preferably provide a peripheral loop dimension of about one wavelength of the radio frequency power produced by the radio frequency generator connected to it.

Before discussing in detail the specific configurations shown in the drawings, it should be pointed out that each of the lumped constant stacked plate resonant circuit components of the patent and preferably of the present invention consists of one or more parallel pairs of closely spaced conductive plates, connected together, with the plates cooperating to provide a capacitance and with their common connection a pair of mutually coupled inductances having their junction at the common connection point. The latter requires that current paths are defined in the plates such that lines of flux from one inductance link with those of the other to provide inductive coupling between them, whereby mutual inductance exists between them. This requires that the current paths defined in the plates be such that spaced paths be provided for circulating radio frequency currents in opposite directions of the plates. This does not mean that such defined current paths may not cross one another, as to provide a current path in the form of a twisted loop having one or more current path crossings. Nor does it mean that some current paths within the plates may not be inconsistent with this requirement; it is the overall effect of the current paths in establishing the required mutual inductance that is important to the circuit component of the invention.

With multiple pairs of plates the same requirement of mutual inductance is required, so that in an assembly of a plurality of plates, the individual plates may be said to alternate. The pairs are always in the same relationship to one another and do not alternatively aid and oppose, for example. The use of multiple pairs is particularly advantageous, not only to enable the provision of a component having the smallest or other most convenient size possible, as may be achieved by using a cubical assembly of stacked plates for minimum size, or an elongated assembly for heating materials conveyed thereby, but, even more important, because of the adding together of the capacitances of the pairs of plates while at the same time reducing their inductance value. This provides a resonant circuit having an uniquely high capacitance relative to its inductance, and one which is hence relatively immune to instability due to variations in the capacitive reactance of a load coupled thereto. It also aids in the establishment of high Q factor as is especially important in resonant tank circuits operating at powers of several kilowatts.

The novel stacked plate resonant circuit component of Patent No. 3,095,548, is excited by means of a suitable radio frequency power source connected between the common plate connection point, normally considered as an R.F. ground point, and some other point, which may be referred to for convenience as a high energy point, on one plate only of a pair remote from the common point, with the current path between such two points defining one of the two series of connected inductances provided by the pair of plates. The corresponding high energy point on the other plate of the pair is, then, connected to the radio frequency power source only by means of the mutual inductance and capacity of the plates, so that current flow in such other plate occurs only by induction due to current flow in the plate to which the source is connected. With an assembly of multiple pairs of plates, the common plate connection points, the power source connection points and the output points are each connected to corresponding points on each of the pairs of plates.

To this general concept described in the above mentioned Patent No. 3,095,548, the present invention adds the concept of radio frequency power coupling means, for example, a plate series such as that of said patent or of a somewhat different type arranged within an extended conductive enclosure preferably extending perpendicularly to and preferably along a wall thereof for a distance which may be as long as several feet, the enclosure walls, in effect providing an electrical loop circuit preferably having an effective peripheral dimension of about one wavelength and preferably being provided with novel arrangements of electrodes for heating material which may, for instance, be moved by an appropriate conveyor through or past the enclosure.

In general, the components and circuits described herein are useful over a frequency range of from a few megacycles to upwards of 100 megacycles or more for any purposes for which conventional resonant circuits are used, and are driven by any of the known radio frequency power sources. Although especially useful in radio frequency heating apparatus, they are also useful in communications equipment and the like.

In connection with the conductive enclosure of the present invention, there is included the concept of enclosures substantially longer than the plate series therewithin, the concept of enclosures having wall openings with electrodes passing through or into such openings for treating material positioned externally of the enclosure, and the concept of novel electrode structures useful in connection with said enclosures. As to the latter, one or more extended plate electrodes preferably mounted within the enclosure parallel to a wall thereof and perpendicular to the plates of the plate series have been found to be highly effective, such plate electrodes being used either by themselves or in conjunction with additional internal or external electrodes, For this purpose of describing in more detail the various objects and features of the present invention, reference is now made to the following detailed description of preferred embodiments thereof, together with the accompanying drawing, wherein:

Figures 11, 12, 13, 14, 15:
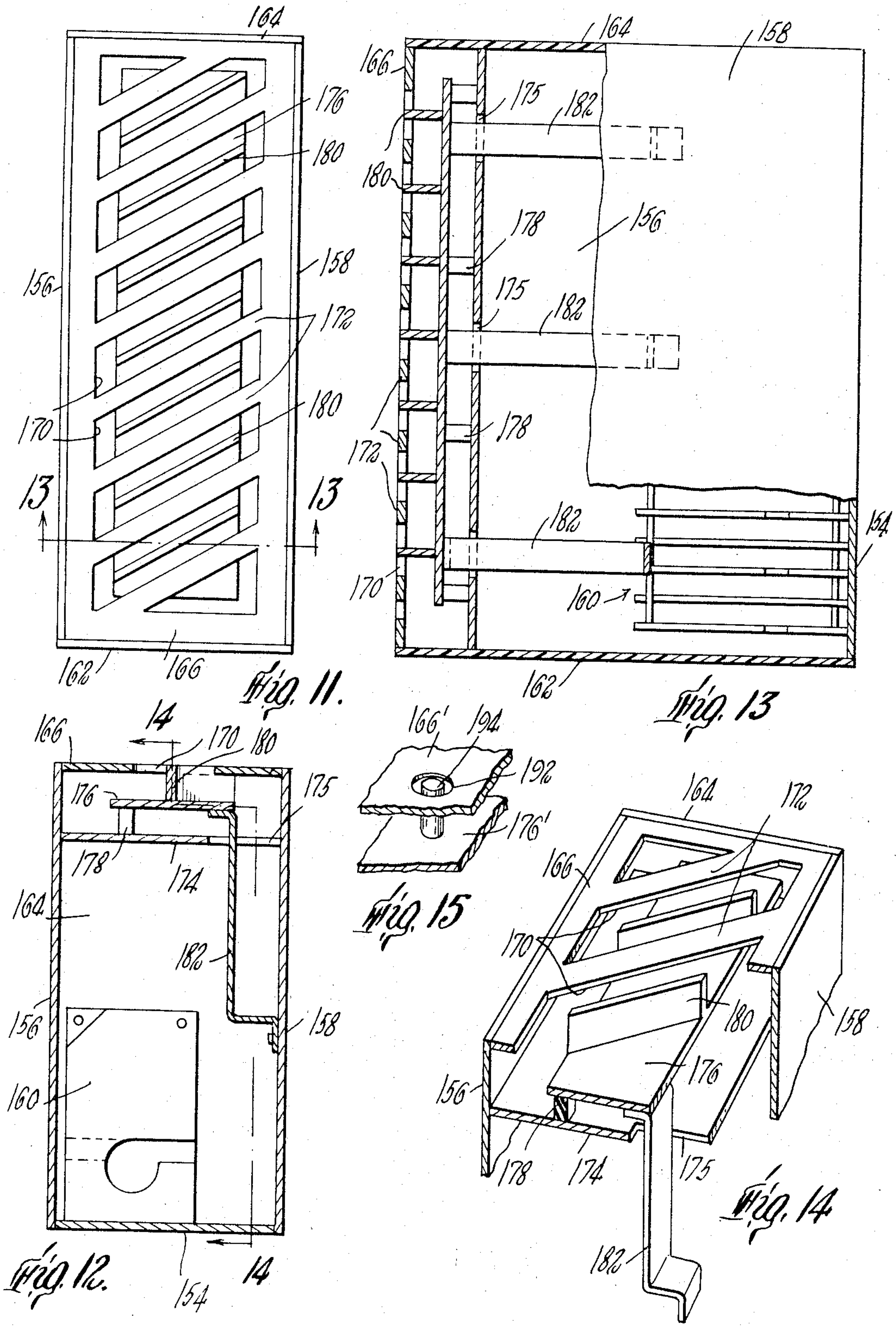
FIG. 11 is a plan view of a fifth preferred embodiment of the invention.

FIGS. 12, 13, and 14 are an end cross-sectional view, a side cross-sectional view and a perspective partial detail sectional view of the embodiment of FIG. 11;

FIG. 15 is a partial detail perspective view of a modification of the embodiment of FIG. 11.

Figures 1, 2:
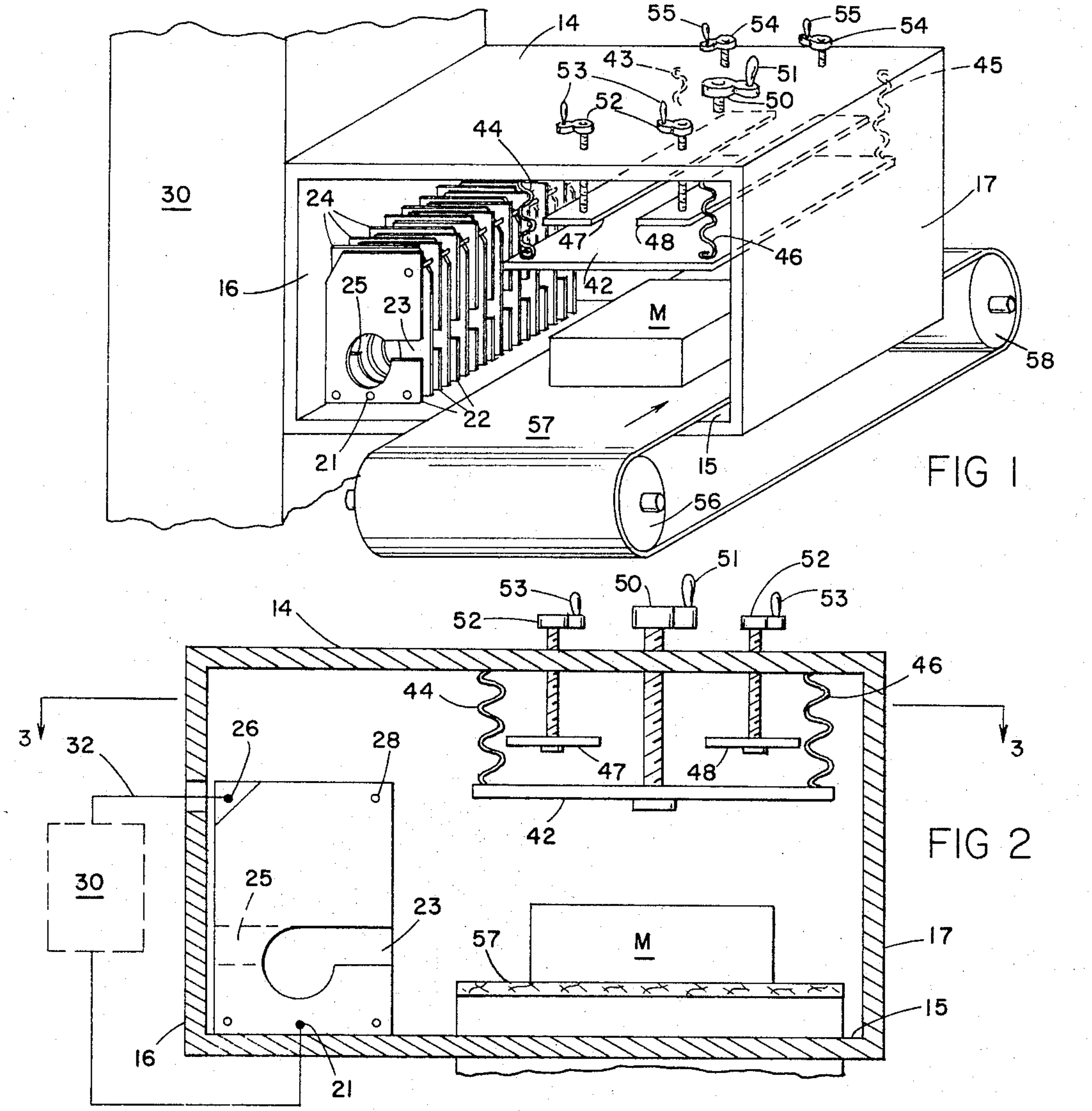
FIG. 1 is a perspective view of a first preferred embodiment of the invention.
FIGS. 2 and 3 are a sectional end view, and a sectional plan view of the embodiment of FIG. 1.
Figure 3:
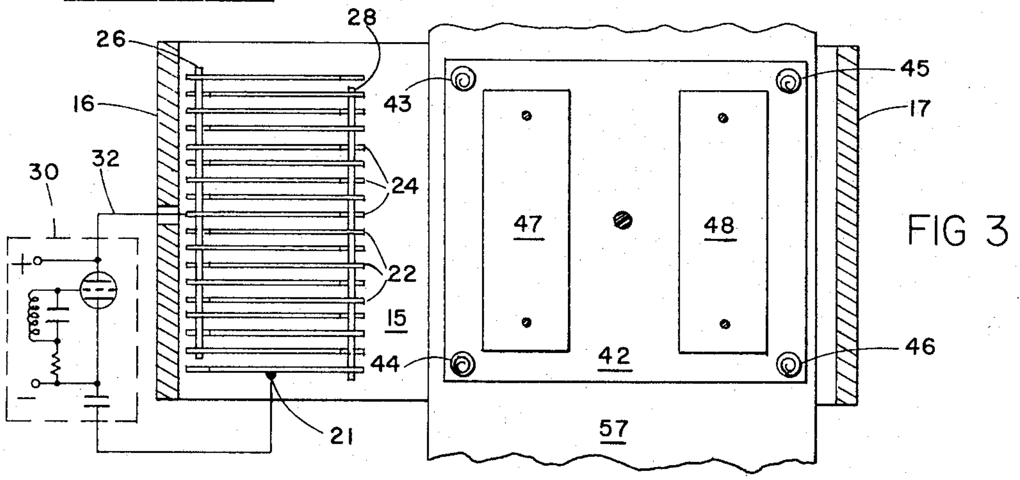

In FIGS. 1 through 3 is shown radio frequency heating apparatus according to the present invention. In general, such apparatus comprises an inclined generally tubular open-ended conductive loop enclosure, preferably of highly electrically conductive sheet metal, such as aluminum or copper and of rectangular cross-section, having within it, extending along one side thereof, a series of slotted plates providing a lumped capacitance and inductance resonant tank circuit of the type disclosed in Patent No. 3,095,548 inductively and capacitively coupled to said enclosure.

More specifically, the enclosure includes two pairs of opposite, spaced, parallel, electrically connected, sheet metal wall members, upper and lower wall members 14 and 15 respectively, and side wall members 16 and 17 providing an axially extended, electrically conductive loop having a pair of opposite open ends spaced a substantial distance from one another along the axis of the enclosure.

The lumped constant tank circuit provided by the series of plates within the enclosure consists of a plurality of electrically conductive plates generally parallel to one another and perpendicular to said wall members 14, 15, 16, 17, said plates being spaced from one another in a direction perpendicular to the plane of said plates for capacitive coupling therebetween. The plates form two series of plates 22 and 24 having therein transverse, alternately extending slots 23 and 25, respectively, with enlarged circular inner ends coaxial with one another. The plates and slots are arranged alternately with one another and are electrically connected at a common point 21 defining a radio frequency current path in one series of plates 22 of opposite direction from that in the other series of plates 24 to provide pairs of mutually inductively coupled inductors as set forth in said patent. The series of plates 22, 24 are mounted at their common connection point 21 extending generally along a common line within the enclosure on bottom wall member 15 and generally along side wall member 17 generally throughout the length thereof between its open ends providing separate connecting points 26, 28 on each of said series of plates remote from said common point 21. A radio frequency generator 30 having one of its terminals connected to the enclosure and hence to said common plate connection point 21 and the other of its terminals connected by wire 32 to said connecting points 26 on one of said series of plates 24, provides radio frequency power to the plate series and to the conductive loop enclosure From an electrical standpoint, the conductive loop of FIGS. 1 through 3 preferably has an electrically effective peripheral dimension of about one full wavelength of the frequency of generator 30 and of the resonant tank circuit which feeds the loop, although this has been found not to be critical and to be affected by any electrode system utilized with it. Electrodes connected to the loop are preferably utilized for capacitive or inductive power transfer to the load, as hereinafter explained in more detail. The axial length of the loop, even up to lengths greater than one wavelength, does not deleteriously affect the operation of the apparatus, which uniquely makes possible the simultaneous heating of an extended segment of material, either stationary or while being conveyed continuously through the apparatus. In the latter situation, the apparatus of the invention makes possible the treatment for substantial time interval of material being conveyed through the apparatus at substantial speeds, so that the apparatus of the invention is particularly useful, for example, in the drying of sheet or particulate material as it is being conveyed therethrough.

In the substantial transverse space provided within the conductive loop enclosure between the plate series and the opposite wall, a variety of electrode systems may be uniquely combined therewith according to the invention, as has been pointed out above and will be hereinafter explained in more detail.

In FIGS. 1 through 3 is shown a preferred electrode system for capacitive heating of material M as it is carried through the loop enclosure by conveyor belt 57 trained around pulleys 56, 58. With this arrangement, according to a specific aspect of the invention there is provided spaced downwardly from and generally parallel to upper wall member 14, a plate electrode 42 having an area such as to occupy a major portion of the portion of the enclosure within which material is to be heated. Plate electrode 42 is electrically connected to wall member 14 generally along its center line for adjustment toward and away from wall 14 by a rotatable mounting element 50 having an operating handle 52 and screw threads cooperating with a suitable screw threaded bore in said upper wall member. Conductive coils 43, 44, 45, and 46 may be connected between each of the four corners of plate electrode 42 and wall member 14 directly thereabove better to distribute the electrical field for uniform heating therebelow, as well as to provide for adjustable support of electrode 42. For more precise electrical tuning of the electrode system to the load provided by the material M, parallel auxiliary plate electrodes 47 and 48 are provided transversely spaced from one another and from mounting element 50 and between plate electrode 42 and upper wall member 14 and parallel thereto. Each of said auxiliary plate electrodes are electrically connected to wall member 14 for adjustment toward and away from plate electrode 42 by a pair of rotatable mounting elements 52, 54 having operating handles 53, 55.

The apparatus is operated simply by energizing it by means of radio frequency generator 30 at a frequency of, say, 10 to 100 megacycles and operating conveyor belt 57 to carry material to be treated through the radio frequency energy field established within the enclosure. As so operated, the plate electrode 42, when vertically adjusted with respect to material M and tuned by auxiliary electrodes 47, 48 for optimum heating of said material, provides a highly uniform radio frequency heating field between itself and lower wall 15.

Figures 4, 9, 10:
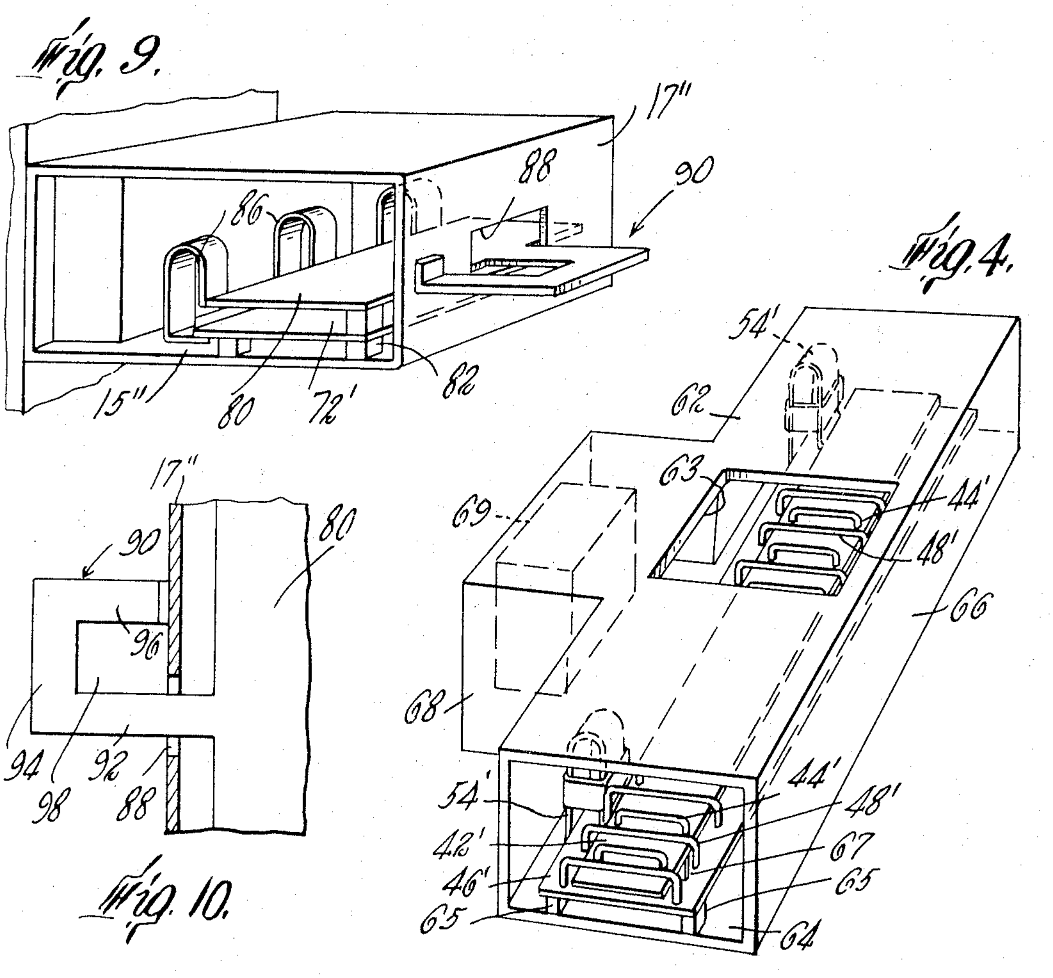
FIG. 4 is a perspective view of a modification of the embodiment of FIG. 1.
FIG. 9 is a perspective view of a fourth preferred embodiment of the invention.
FIG. 10 is a sectional detail view of a portion of the embodiment of FIG. 9.

In FIG. 4 is shown a modification of the apparatus of FIGS. 1 through 3 wherein an unusually extended heating field is provided by a plate series very much shorter than such systems.

This is accomplished by means of an enclosure generally of T shape, with an upper wall 62 of T shape spaced above a similarly shaped lower wall 64 and connected to it by a straight elongated side wall 66 along one side of the crossing element of the T and an opposite elongated side wall 68 having a central offset portion around the base of the T and opposite end portions along the other side of the crossing element of the T beyond the offset portion. The opposite ends of the T crossing element are open, with a lumped constant tank circuit like that of FIGS. 1 through 3 and generally designated 69 within the offset portion of side wall 68. In order to ensure that adequate current flow be provided adjacent the ends of the T at least one of the upper or lower wall members, herein shown as upper wall member 62, is provided with a slot 63 which extends along said wall member for a substantial distance, preferably of the order of at least the length of the assembly of plates forming the tank circuit 69.

A series of electrodes of the stray field type are provided, although those of FIGS. 1 through 3 could also be used, attached to the bottom wall 64, rather than the top wall, in the structure of FIG. 4, although the other arrangement could be used as well. Thus the arrangement includes a plate 34, mounted by insulators 65 on bottom wall 64 and a parallel plate 36 mounted thereabove by insulators 67, said plates being connected by coupling loops 38 and having electrodes 35, 37, with their surfaces generally in a common plane, so that, for example, sheet material can be continuously passed through the apparatus over the electrodes to dry it. As so operated, the transversely elongated stray field rod elements, with each series electrically coupled to the enclosure by its respective plate electrode, provides a radio frequency heating field which extends between adjacent stray field electrodes throughout the series thereof. For surface heating, on one side of material passing adjacent the electrodes, they may be arranged in a common plane. For heating through material or heating both surfaces thereof, it is preferable that the two series be arranged in spaced planes for passage of the material to be heated therebetween, with the electrodes of each series opposite to or staggered with respect to one another.

Figures 5, 6, 7:
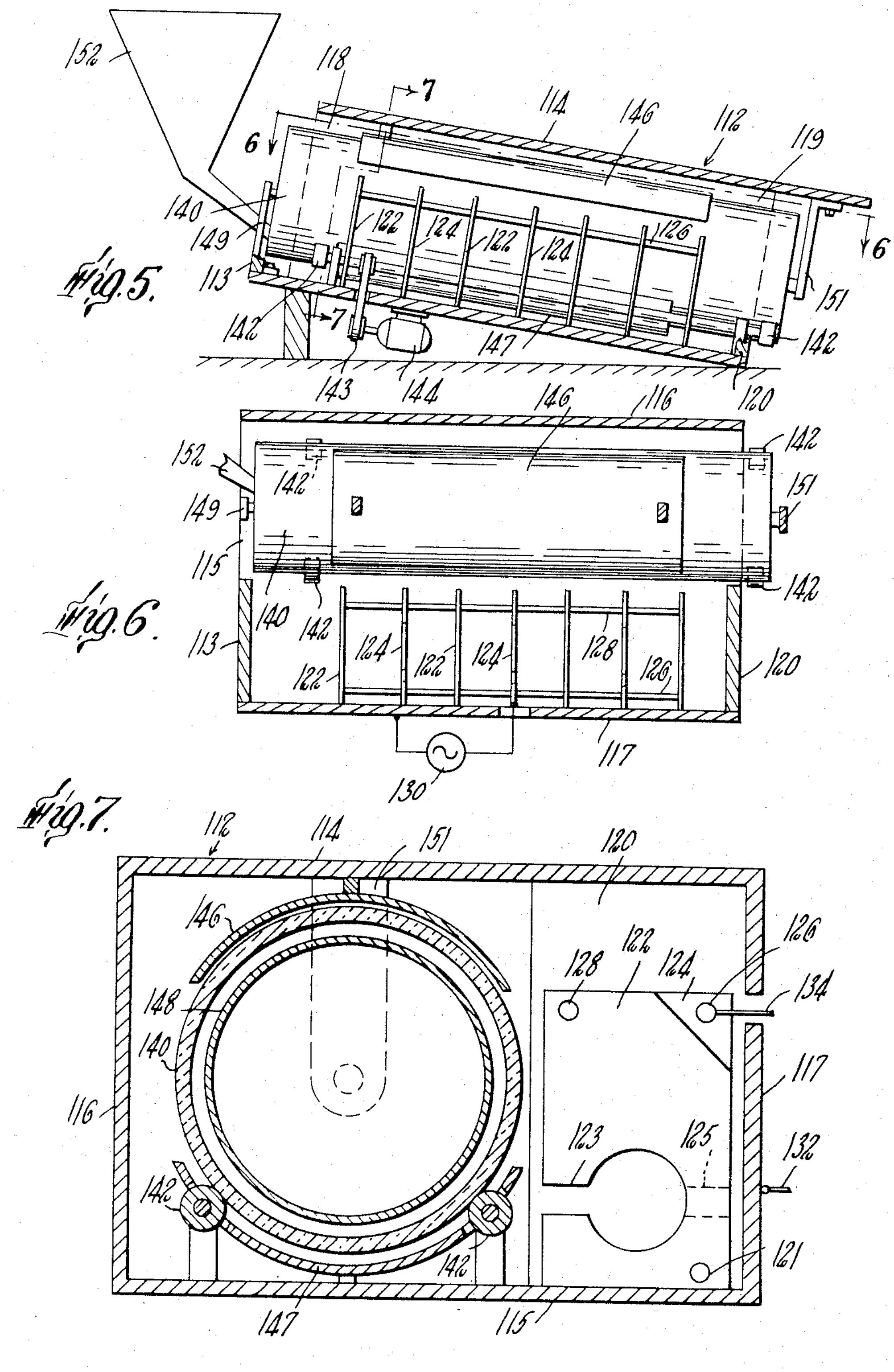
FIG. 5 is a side view of a second preferred embodiment of the invention modified from that of FIGS. 1 through 3.
FIG. 6 and 7 are a sectional plan view and a sectional end view of the embodiment of FIG. 5.

In FIGS. 5 through 7 is shown another embodiment of radio frequency heating apparatus according to the invention. In general, such apparatus comprises an inclined, generally tubular, open-ended conductive loop enclosure, generally designated 112 and of the type described with reference to FIGS. 1 through 3, including a series of slotted plates providing a lumped capacitance and inductance resonant tank circuit inductively and capacitively coupled to said enclosure.

More specifically, enclosure 112 includes two pairs of opposite, spaced, parallel, electrically connected, sheet metal wall members, upper and lower wall members 114 and 115, respectively, and side wall members 116 and 117, providing an axially extended, electrically conductive loop having a pair of opposite open ends 118 and 119 spaced a substantial distance from one another. Partial end closure plates 120 and 113 may be used.

The lumped constant tank circuit provided by the series of plates within enclosure 112 consists of a plurality of electrically conductive plates generally parallel to one another and perpendicular to said wall members 114, 115, 116, 117, said plates being spaced from one another in a direction perpendicular to the plane of said plates for capacitive coupling therebetween. The plates form two series of plates 112 and 124 having therein transverse, alternately extending slots 123 and 125, respectively, with enlarged circular inner ends coaxial with one another. The plates and slots are arranged alternately with one another and are electrically connected at a common point 121 defining a radio frequency current path in one series of plates 122 of opposite direction from that in the other series of plates 124 to provide pairs of mutually inductively coupled inductors as set forth in said patent. The series of plates 122, 124 are mounted at their common connection points 121 extending generally along a common line within enclosure 112 on bottom wall member 115 and generally along side wall member 117 generally throughout the length thereof between its open ends 118, 119 providing connecting points 126, 128 on each of said series of plates remote from said common point 121. A radio frequency generator 130 having one of its terminals connected to enclosure 112 and hence to said common plate connection points 121 and the other of its terminals connected to said connecting points 126 on one of said series of plates 124, provides radio frequency power to the plate series and to the conductive loop enclosure 112.

In the transverse space provided within conductive loop enclosure 112 between its series of plates 122 and 124 and the side wall member 116 opposite said plates is positioned a rotatable, electrically insulated, tube conveyor at an incline with said enclosure and extending therealong between said open ends 118, 119 for carrying material throughout the axial length of said enclosure for heating said material by radio frequency energy as it passes throughout the entire axial length of said enclosure. More specifically, the tube conveyor includes a central tube 140 preferably of glass, rotatably supported and driven by underlying rolls 142, which are in turn driven by belts 143 from a motor 144. An upper electrode 146 and a lower electrode 147 are provided connected, preferably, to upper wall 114 and lower wall 115, said electrodes extending along the tube 140 preferably for the axial extent of said wall members. Preferably, too, a fixed central coaxial electrode 148 is provided spaced inwardly of the inner wall of said tube 140, supported at its ends by brackets 149 and 151. A hopper 152 is provided for feeding particulate material into the space between the inner wall of tube 140 and central electrode 148 at the upper input end of tube 140, while material passing from the lower output end of said tube is collected in a suitable container (not shown). Other types of conveyors, such as a moving belt conveyor having appropriate upper and lower electrodes as required, may be utilized with the conductive loop structure above described, or materials may simply be heated therein without being conveyed therethrough.

From an electrical standpoint the conductive loop of FIGS. 5 through 7 preferably has a peripheral dimension one full wavelength of the frequency of generator 130 and of the resonant tank circuit which feeds the loop, although this has not been found to be critical. Electrodes are utilized if and as required, connected to peripherally spaced portions of the loop. The axial length of the loop, even up to lengths greater than one wavelength, does not deleteriously affect the operation of the apparatus, which makes possible the simultaneous heating of an extended segment of material, either stationary or while being conveyed continuously through the apparatus. In the latter situation, the apparatus of the invention makes possible the treatment for a substantial time interval of material being conveyed through the apparatus at substantial rates, so that the apparatus of the invention is useful, for example in the commercial roasting of coffee, peanuts or the like.

The apparatus is operated to roast particulate material such as coffee beans, or peanuts, simply by energizing it at a frequency of, say 50 to 100 megacycles, by rotating tube 140 and filling hopper 152 with the material to be roasted, the material passing through tube 140 under the influence of gravity and its rotation through the radio frequency energy field established within enclosure 112 until the material passes beyond the enclosure.

Figure 8:
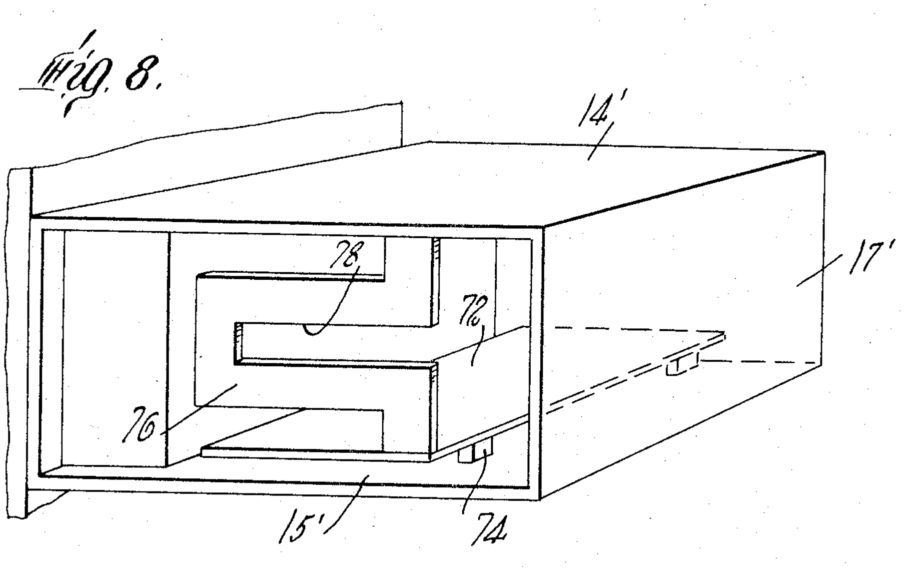
FIG. 8 is a perspective view of a third preferred embodiment of the invention.

In FIG. 8 is shown another internal electrode structure modified from that of FIGS. 1 through 3 including a plate 72 mounted on lower wall member 15' and spaced in a parallel plane therefrom by insulating members 74. Extending in a transverse plane and connected between said plate and upper wall member 14' is a flat hairpin loop member 76 providing a transverse slot 78 therein. Material to be treated, as for heat sealing along a narrow line, is positioned in slot 78 spaced from its edges. Alternatively, an endless web of material to be treated, say for drying it, may be passed through said slot.

In FIGS. 9 through 15 are shown radio frequency heating apparatus according to an important aspect of the invention, such apparatus differing from that of FIGS. 1 through 8 mainly in that electrode systems are provided which extend toward or through openings in a wall of the loop enclosure for treatment of materials positioned in the radio frequency field created between such an electrode and the side of a surrounding opening or an external extension of the enclosure, to treat materials which, for example, may be outside the enclosure. As with the earlier described FIGS. 1 through 8, the apparatus comprises a generally tubular open-ended conductive loop enclosure, preferably of sheet metal, such as aluminum or copper, and of circular, semi-circular or rectangular cross-section having within it, extending along one side thereof, a series of slotted plates providing a lumped capacitance and inductance resonant tank circuit inductively and capacitively coupled to said enclosure.

Structures such as are shown in FIGS. 9 through 15 are especially useful in applications wherein limited surface penetration of a material to be treated is desired, or wherein it is desired to take advantage of the unique characteristic of the enclosure of the invention with an enclosure of relatively small size. In the first type of application, the structure of the invention makes possible the heat sealing, for example, of ice cream cartons, without melting the contents thereof, while the second type of application makes possible the heating, as for sealing, of structures which cannot conveniently be introduced into the enclosure.

Thus, in FIGS. 9 and 10 is shown a structure generally similar to that of FIG. 8, except that a double plate electrode system having an external loop extending through and beyond the enclosure is provided for heating an object introduced into the radio frequency field present within the external loop. More specifically, the enclosure has a plate 72' mounted on lower wall member 15'' by insulating member 74' and a second plate 80 spaced thereabove in a parallel plane by additional insulating member 82. Plate 80 may be electrically connected to bottom plate 72' by a sheet metal hairpin loop 86 which may be tunable. Plate 80 may be used as an internal electrode for treating materials within the enclosure, as may the single plate of FIG. 8, and may also be used to energize an external loop, generally designated 90, in the form of a U shaped extension of plate 80. For the latter purpose, loop 90 has its leg 92 connected to plate 80 and extending outwardly through wall opening 88 beyond end wall 17'' and its other leg 96 connected to the outer surface of end wall 17'', the base portion 94 of the extension being spaced outward from said wall so that a loop opening 98 is provided within the U within which loop opening may be introduced materials or structures to be heated.

In FIGS. 11 through 14 is shown an embodiment of the invention having a flush electrode system especially useful for drying or otherwise treating a sheet material moving therealong. Such structure includes a conductive loop enclosure having a bottom wall 154 and side walls 156, 158 extending upwardly therefrom. A series of plates, herein generally designated 160, are positioned along said bottom wall between the lower portions of said side walls, such being energized by a suitable radio frequency generator as shown, for example, in FIG. 2. If desired, nonconductive end plates, of sheet plastic material, may be used to complete the enclosure.

The flush stray field electrode structure, itself comprising the remaining portion of the conductive loop, includes an upper wall 166 extending between the upper edges of side walls 156, 158, such upper wall having a plurality of generally transversely extending slots 170 preferably parallel to one another and extending at an angle so that their ends overlap the ends of adjacent slots in a longitudinal direction. Slots 170 thus form therebetween a plurality of generally transversely extending elongated outer electrodes 172, positioned in parallel spaced apart relation. An inner wall 174 parallel to outer upper wall 166 extends between side walls 156, 158, and supports thereon between it and wall 166 a plate electrode 176 by means of insulators 178. On said plate electrode are mounted a plurality of elongated transversely extending upright inner electrodes 180 at an angle arranged to be parallel to outer electrodes 172 and spaced therebetween, their upper free ends preferably being flush with the outer surfaces of said outer electrodes. Plate electrode 176 is electrically connected to side wall 158 by means of three coupling links 182 extending from said plate to said side wall through openings 175 in inner plate, the length of such links being changed as needed for tuning. The electrodes 170 and 180 thus form two series of stray field electrodes, arranged alternately with one another and respectively electrically coupled to the enclosure to provide a radio frequency field between adjacent electrodes of the series.

In use, material to be treated, as for heat sealing, is placed on the outer surface of outer upper wall 166 so that its surface or materials thereon or immediately adjacent thereto are subjected to the radio frequency field extending between inner electrodes 180 and the edges of openings 140 defining outer electrodes 172.

FIG. 15 shows a modification of the structure of FIGS. 11 through 14 wherein upper wall 166' has but a single circular opening 192 therein, with a single solid or hollow rod element 194 mounted on plate electrode 176' having its free end generally flush with and coaxial to said opening. With such an arrangement, by supplying a desired gas under pressure to the interior of the enclosure, and by energizing the electrodes, a gas plasma generator can be provided. Alternatively, gas may be fed through the hollow interior of rod element 194.

Thus, it will be seen that the invention provides novel resonant circuits and components mounted within an enclosed loop, all especially useful at high frequencies and high powers to provide novel radio frequency heating apparatus of high efficiency and stability at reasonable cost. Various modifications thereof, within the spirit of the invention and the scope of the appended claims, will be apparent to those skilled in the art.

I claim:

1. Radio frequency heating apparatus comprising a generally tubular conductive enclosure having opposite, spaced, parallel, connected, sheet metal wall members providing an axially extended conductive loop having a pair of opposite ends spaced a substantial distance from one another a lumped constant resonant circuit component comprising a plurality of electrically conductive plates generally parallel to one another and perpendicular to said wall members, said plates being spaced from one another in a direction perpendicular to the plane of said plates and being mounted along a common line within and generally along said wall members throughout a substantial portion of the length thereof between said opposite ends closely spaced to one of said wall members, said plates forming two series of plates arranged alternately with one another, defining a radio frequency current path in one series of plates of opposite direction from that in the other series of plates for mutual coupling therebetween, and radio frequency generator means connected to said common line and to connecting points on at least one of said series of plates, said two series of plates being the major resonant circuit component of the output of said generator means, providing a radio frequency power source within said enclosure energizing said enclosure to heat material.

2. Radio frequency apparatus as claimed in claim 1, wherein said loop has a peripheral extent of about the wavelength of the radio frequency power provided by said generator means.

3. Radio frequency apparatus as claimed in claim 1 wherein the opposite one of said wall members is spaced a substantial distance from said plates throughout the length of said enclosure providing an axially extending through passage of substantial cross-sectional dimension.

4. Radio frequency apparatus as claimed in claim 1, further comprising electrode means electrically coupled to said enclosure for heating material positioned adjacent said electrode means by said radio frequency power source.

5. Radio frequency apparatus as claimed in claim 4 wherein said electrode means includes conductive plate means mounted parallel to a wall portion of said enclosure and perpendicular to said plates.

6. Radio frequency apparatus as claimed in claim 4 wherein said electrode means includes stray field electrode means having a plurality of elongated electrodes positioned in parallel spaced apart relation generally parallel to a wall of said enclosure and at an angle to said plates, said elongated electrodes forming two series of electrodes arranged alternately with one another and respectively electrically coupled to said enclosure to provide said radio frequency field between adjacent electrodes of said series.

7. Radio frequency heating apparatus comprising an electrically conductive generally tubular enclosure having a wall and providing an extended conductive loop a lumped constant resonant circuit component comprising a plurality of electrically conductive plates generally parallel to one another and spaced from one another in superposed relationship in a direction perpendicular to the plane of said plates, said plates forming two series of plates arranged alternately with one another for capacitive coupling therebetween to provide mutually inductively coupled inductors defining a radio frequency current path in one series of said plates of opposite direction from that in the other series of said plates mounting means for mounting said plates within said series of enclosure and generally perpendicular to and along a wall portion of said enclosure in a position spaced from an opposite wall portion of said enclosure radio frequency generator means connected to said plates for generating a radio frequency field, said two series of plates being the major resonant circuit component of the output of said generator means providing a radio frequency source within said enclosure energizing said enclosure, and electrode means including axially extended conductive electrode plate means mounted parallel to a wall portion of said enclosure and perpendicular to said plates, said electrode plate means being electrically coupled to said enclosure as energized by said two series of plates for heating material positioned adjacent said electrode means by the radio frequency field produced within said enclosure.

8. Radio frequency heating apparatus as claimed in claim 7 further including auxiliary tuning plate means parallel to said plate means between it and a said wall and movable perpendicularly to its plane.

9. Radio frequency heating apparatus as claimed in claim 7 wherein said wall of said enclosure has an opening therein and said electrode means extends into said opening in a position spaced from said wall.

10. Radio frequency heating apparatus as claimed in claim 7, further including U shaped electrode means electrically connected to said conductive plate means.

11. Radio frequency heating apparatus as claimed in claim 10, wherein said U shaped electrode means lies in a plane parallel to said plates and extends between said conductive plate means and a wall of said enclosure parallel to said conductive plate means.

12. Radio frequency heating apparatus as claimed in claim 10, wherein said wall of said enclosure has an opening therein and wherein said U shaped electrode means extends through and beyond said opening.

13. Radio frequency heating apparatus comprising an electrically conductive generally tubular enclosure having walls and providing an extended conductive loop with ends spaced a substantial distance from one another a plurality of electrically conductive plates generally parallel to one another and spaced from one another in superposed relationship in a direction perpendicular to the plane of said plates for capacitive coupling therebetween to provide pairs of mutually inductively coupled inductors mounting means for mounting said plates within said enclosure generally centrally thereof and generally perpendicular to and along a wall portion of said enclosure in a position spaced from an opposite wall portion of said enclosure radio frequency generator means connected to at least one of said series of plates for generating a radio frequency field and electrode means mounted within said enclosure between said plates and said opposite wall portion and between the ends of said enclosure for heating material positioned adjacent said electrode means by said radio frequency field said enclosure having slot means extending through a wall thereof along said series of plates causing increased flow of radio frequency current around said loop outwardly beyond said series of plates.

14. Radio frequency heating apparatus as claimed in claim 7, wherein said electrode means includes a pair of axially extended conductive plate electrodes mounted in superposed position parallel to and spaced from one another and a wall of said enclosure and perpendicular to said plate, said plate electrodes being electrically coupled to said enclosure for heating material positioned adjacent said plate electrodes by said radio frequency field.

15. Radio frequency apparatus as claimed in claim 14, wherein said electrode means includes stray field electrode means having a plurality of elongated electrodes positioned in parallel spaced apart relation generally parallel to a wall of said enclosure and at an angle to said plates, said elongated electrodes forming two series of electrodes arranged alternately with one another and each mounted on one of said plate electrodes for electrical coupling to said enclosure to provide said radio frequency field between the electrodes of said series.

16. Radio frequency heating apparatus as claimed in claim 14, wherein said plate electrodes are mounted within said plate electrodes are mounted within said enclosure between said plates and an opposite wall of said enclosure and extend along a wall of said enclosure between the open ends thereof.

17. Radio frequency apparatus as claimed in claim 16 wherein coupling loop means are provided between said plate electrodes.

18. Radio frequency apparatus as claimed in claim 17, wherein means are provided for adjusting the electrical length of said coupling loop means.

19. Radio frequency heating apparatus comprising an electrically conductive generally tubular enclosure having walls providing an extended conductive loop generally rectangular in cross-section with ends spaced a substantial distance from one another and having a plurality of elongated openings in parallel spaced apart relation in a wall of said enclosure a plurality of electrically conductive plates generally parallel to one another and spaced from one another in superposed relationship in a direction perpendicular to the plane of said plates for capacitive coupling therebetween to provide pairs of mutually inductively coupled inductors, said plates forming two series of plates arranged alternately with one another defining a radio frequency current path in one series of plates of opposite direction from that in the other series of plates mounting means for mounting said plates within said enclosure and generally perpendicular to and along a wall portion of said enclosure in a position spaced from an opposite wall portion of said enclosure radio frequency generator means connected to at least one of said series of plates for generating a radio frequency field and electrode means including axially extended conductive plate means mounted parallel to said wall of said enclosure having said openings and perpendicular to said plates and a plurality of elongated electrodes positioned on said plate in parallel spaced apart relation with their free ends within said openings generally flush with said wall having said openings, said elongated electrodes with the plurality of electrodes formed by said openings forming two series of stray field electrodes, said plate means being electrically coupled to said enclosure for heating material positioned adjacent said wall having said opening means by said radio frequency field.

20. Radio frequency heating apparatus comprising a generally tubular conductive enclosure of rectangular cross-section having two pairs of opposite, spaced, parallel, connected, sheet metal wall members providing an axially extended conductive loop having a pair of opposite open ends spaced a substantial distance from one another a plurality of electrically conductive plates generally parallel to one another and perpendicular to said wall members, said plates being spaced from one another in a direction perpendicular to the plane of said plates and being mounted along a common line within and generally along said wall members throughout the length thereof between said open ends closely spaced to one of said wall members, with the opposite of said wall members being spaced a substantial distance from said plates throughout the length of said enclosure providing an axially extending through passage of substantial cross-sectional dimension, said plates forming two series of plates arranged alternately with one another, defining a radio frequency current path in one series of plates of opposite direction from that in the other series of plates rotatable electrically insulating tube conveyor means positioned within said enclosure between said plates and said opposite one of said wall members extending therealong between said open ends, said tube conveyor means including opposite electrode means extending therealong connected to said wall members at spaced portions thereof for carrying material to be heated in the space between said tube and said central electrode throughout the axial length of said enclosure and radio frequency generator means connected to said common line and to said connecting points on one of said series of plates providing radio frequency power to heat said material.

References Cited

UNITED STATES PATENTS

| | | | |
|---|---|---|---|
| 2,504,956 | 4/1950 | Atwood | 219—10.73 |
| 2,504,969 | 4/1950 | Ellsworth | 219—10.73 |
| 2,783,344 | 2/1957 | Warren | 219—10.55 |
| 2,783,346 | 2/1957 | Warren | 219—10.55 |
| 3,095,548 | 6/1963 | Manwaring | 219—10.75 |

RICHARD M. WOOD, *Primary Examiner.*

L. H. BENDER, *Assistant Examiner.*